United States Patent [19]

Kelly

[11] Patent Number: 4,906,428
[45] Date of Patent: Mar. 6, 1990

[54] PREPARATION OF PHYSICAL BLENDS OF POLYMERS AND PIGMENTS

[75] Inventor: Peter Y. Kelly, Kingston, Canada

[73] Assignee: Du Pont Canada Inc., Mississauga, Canada

[21] Appl. No.: 299,980

[22] Filed: Jan. 23, 1989

[30] Foreign Application Priority Data

Feb. 17, 1988 [GB] United Kingdom ............... 8803674

[51] Int. Cl.$^4$ .................. B28B 1/20; B29C 31/06; G05D 11/00
[52] U.S. Cl. ................... 264/310; 264/122; 264/349; 366/160; 366/162; 523/346; 523/351
[58] Field of Search ........... 264/310, 311, 349, 210.6, 264/211, 122, 109, 117; 366/16, 20, 21, 160, 161, 112, 76, 98, 152; 523/346, 351; 524/586; 425/145

[56] References Cited

U.S. PATENT DOCUMENTS

| | | | |
|---|---|---|---|
| 2,109,592 | 4/1936 | Macht | 523/346 |
| 2,540,146 | 2/1951 | Stober | 523/351 |
| 3,030,330 | 4/1962 | Cines et al. | 264/349 |
| 3,229,002 | 1/1966 | Feder | 264/15 |
| 3,271,354 | 9/1966 | Weissert | 523/351 |
| 3,320,639 | 5/1967 | Harp | 425/543 |
| 3,484,262 | 12/1969 | Hahn | 264/109 |
| 3,591,409 | 7/1971 | Aubrey et al. | 428/407 |
| 3,627,869 | 12/1971 | Walton | 264/310 |
| 3,632,369 | 1/1972 | Hahn | 428/407 |
| 3,736,173 | 5/1973 | Okada et al. | 428/407 |
| 3,997,494 | 12/1976 | Lever et al. | 524/586 |
| 4,029,729 | 6/1977 | Rees et al. | 264/310 |
| 4,039,507 | 8/1977 | Paige et al. | 524/402 |
| 4,230,615 | 10/1980 | Crocker et al. | 523/303 |
| 4,255,367 | 3/1981 | Wallace et al. | 425/145 |
| 4,526,916 | 7/1985 | White | 524/128 |
| 4,555,379 | 11/1985 | Maringer et al. | 264/310 |
| 4,587,318 | 5/1986 | Inoue et al. | 264/310 |
| 4,684,488 | 4/1987 | Rudolph | 425/145 |

FOREIGN PATENT DOCUMENTS

| | | | |
|---|---|---|---|
| 649800 | 10/1962 | Canada | 523/351 |
| 1230271 | 12/1987 | Canada . | |
| 2500664 | 7/1976 | Fed. Rep. of Germany | 523/351 |
| 1122517 | 11/1984 | U.S.S.R. | 366/76 |
| 863732 | 3/1961 | United Kingdom | 523/351 |

*Primary Examiner*—Jeffery Thurlow
*Assistant Examiner*—Mathieu Vargot

[57] ABSTRACT

A method for the manufacture of a physical blend of pigment and a polymer powder whereby polymer powder having a particle size in the range of 250 to 750 microns is fed to a high intensity mixer and then powdered pigment is fed to the mixer at a rate of not more than 0.5 parts of pigment per 100 parts of polymer per minute. The pigment has a particle size that is substantially smaller than that of the polymer powder. The resultant admixture is mixed for a further period of time and then discharged from the mixer. The method is particularly applicable to powdered polyethylene intended for use in a rotational moulding process e.g. for the manufacture of containers and other hollow articles.

13 Claims, No Drawings

PREPARATION OF PHYSICAL BLENDS OF POLYMERS AND PIGMENTS

The present invention relates to a process for preparation of physical blends of polymers and pigments. In particular, the invention relates to the pigmentation of polymers intended for use in rotational moulding processes, and especially to the manufacture of physical blends of polymer and pigment suitable for use in such processes.

One method for the manufacture of articles from thermoplastic polymers, especially polyolefins, is by the use of rotational moulding techniques. Such techniques may be used in the fabrication of articles of complex shapes and/or large dimensions, especially articles that are hollow, e.g tanks and other large containers. In a rotational moulding process, polymer in the form of a powder is placed in the mould of a rotational moulding process. The mould is then closed and rotated about at least two axes while being heated, so that the polymer powder contacts the internal walls of the mould and the walls become coated with a layer of molten polymer. The mould is then cooled and the moulded article thus obtained is removed from the mould.

The polymer fed to the mould of a rotational moulding process is in the form of a powder, and this is necessary so that a uniform distribution of molten polymer may be rapidly obtained on the inside of the mould during rotation of the mould. A rotational moulding process operates most effectively with polymer that flows readily when in a molten condition, i.e. a polymer of relatively low molecular weight, whereas it is usually preferred with respect to the properties of the resultant article that the polymer be of relatively high molecular weight. Thus, cross-linking agents are often incorporated into the polymer composition fed to the mould so that the polymer may have good flow characteristics during the moulding process and then be cross-linked to form a moulded article of commercially acceptable properties, as is disclosed by G. White in U.S. Pat. No. 4,529,916, which issued 1985 July 02.

For many end uses, it is necessary or important that the moulded article be of a colour other than the natural colour of the polymer. Thus, pigments are frequently incorporated into the polymer powder composition fed to the mould of the rotational moulding process. It has been found that merely admixing pigment and powdered polymer using dry blending techniques e.g. using a tumble blender, does not result in the manufacture of moulded articles of acceptable properties. For example, the article tends to have poor opacity and poor physical properties, both of which are probably due to uneven distribution of pigment.

Alternatively, pigment and polymer may be fed to a compounding extruder equipped with suitable mixing screws so that a uniform melt blend is obtained. The melt blend is then ground into a powder, the form in which the polymer is fed to the mould of rotational moulding apparatus. It has been found that the resultant moulded articles have good opacity and acceptable physical properties. However, such a preparation of the pigmented polymer powder involves both a melt compounding step and a regrinding step, thereby making such a method economically unattractive, although it is used commercially for the manufacture of pigmented compositions for the rotational moulding of articles of good opacity and physical properties.

It has now been found that physical blends of particles of pigment and polymer powder that give rotationally moulded articles of acceptable opacity and physical properties may be obtained using high intensity mixers and a metered feeding of pigment.

Accordingly, the present invention provides a method for the manufacture of a physical blend of particles of polymer and pigment, said method comprising the steps of:

(a) feeding a powder of a thermoplastic polymer to a high intensity mixer, said powder having a particle size in the range of 250 to 750 microns;

(b) feeding a powdered pigment to the high intensity mixer at a rate of not more than 0.5 parts of pigment per 100 parts of polymer powder per minute, said pigment having a particle size that is substantially smaller than the particle size of the polymer, the polymer powder and pigment being admixed in said high intensity mixer during the period of addition of the pigment to the mixer;

(c) subsequent to the feeding of the pigment to the mixer, continuing admixing of the polymer powder and pigment powder in the high intensity mixer for a period of time at least 50% as long as the time of addition of the pigment to the high intensity mixer; and (d) discharging the resultant physical blend from the mixer.

In a preferred embodiment of the present invention, the physical blend is intended for use in a rotational moulding process.

The present invention also provides a process for the rotational moulding of articles, comprising:

(a) feeding to the mould of rotational moulding apparatus a physical blend of powdered polymer and pigment, said blend having been formed in a high intensity mixer by (i) feeding a powder of a thermoplastic polymer to a high intensity mixer, said powder having a particle size in the range of 250 to 750 microns, (ii) feeding a powdered pigment to the high intensity mixer at a rate of not more than 0.5 parts of pigment per 100 parts of polymer powder per minute, said pigment having a particle size that is substantially smaller than the particle size of the polymer, the polymer powder and pigment being admixed in said high intensity mixer during the period of addition of the pigment to the mixer, (iii) subsequent to the feeding of the pigment to the mixer, continuing admixing of the polymer powder and pigment powder in the high intensity mixer for a period of time at least 50% as long as the time of addition of the pigment to the high intensity mixer, and (iv) discharging the resultant physical blend from the mixer;

(b) rotating said mould about at least two axes while heating the mould, so that a molten layer of polymer containing pigment is formed on the inside of the mould; and (c) cooling the mould and removing the article so moulded.

In a preferred embodiment of the method and process of the present invention, the high intensity mixer is equipped with blades adapted to break up any agglomerates of pigment, especially blades that have edges that are not smooth and rounded.

In another embodiment, the high intensity mixer is equipped with blades that are rotated such that the tips of the blades move at a speed of at least 2000 cm/sec, especially at least 4000 cm/sec.

The polymer used in the method of forming the physical blend of the present invention is, in particular, a polyolefin that is a homopolymer or copolymer of a $C_2$-$C_{10}$ alpha-olefin and type used in rotational moulding processes. Homopolymers and copolymers of ethylene are preferred. The latter polymers are usually referred to as polyethylene and the present invention will be particularly described with reference thereto.

The polyethylene has a density in the range of about 0.920–0.970 g/cm$^3$, especially a density in the range of 0.950–0.970 g/cm$^3$ The density of the polyethylene will depend in particular on the intended end-use for the moulded articles. The polyethylene may be a homopolymer of ethylene or a copolymer of ethylene and higher alpha-olefins, for example copolymers of ethylene and a minor amount of at least one $C_4$-$C_{10}$ alpha-olefin, examples of which are butene-1, 4-methyl pentene-1, hexene-1 and octene-1. Techniques for the manufacture of such polyethylene are known in the art. In particular, the polyethylene may have a melt index, as measured by the method of ASTM D-1238 (condition E), in the range of 3–35 dg/min and especially in the range of 15–35 dg/min. As will be appreciated by those skilled in the art, polyethylene intended for use in a rotational moulding process should have a narrow molecular weight distribution.

The polyethylene may contain an organic peroxide cross-linking agent e.g. a bis (tert. alkyl peroxy alkyl) benzene, dicumyl peroxide or acetylenic diperoxy compound or the like as will be understood by those skilled in the art. The preferred organic peroxide is bis (tert. butyl peroxyisopropyl) benzene, which is available from Hercules Inc. under the trademark Vulcup. Typical amounts of organic peroxide are in the range of 0.3–1.5% by weight but other amounts may be used.

The polyethylene may also contain stabilizers, especially antioxidants and ultra violet stabilizers, and other additives e.g. co-agents to promote cross-linking reactions.

The polyethylene used in the method of the present invention to form a physical blend of pigment and polyethylene is in the form of a powder of the type used in a rotational moulding process. It is intended that the powder, after blending with pigment, may be used in the rotational moulding process without further comminution or other change in physical properties. Thus the polyethylene is preferably in the form of a powder having a particle size in the range of from about 250 to 750 microns, and especially in the range of from about 300 to 500 microns.

The polyethylene powder is fed to a high intensity mixer. Such a mixer is not a heated mixer, although it might be a cooled mixer in order to reduce the likelihood of melting of polymer during the mixing process. As used herein, a high intensity mixer is a mixer that is equipped with at least one stirrer that is rotatable at a high rate, especially such that the tip speed of the blade is at least 2000 cm/sec and in particular at least 4000 cm/sec. High intensity mixers are known in the art, examples being a Henschell* mixer and a Waring* blender. The diameter of the blade should be at least 50% of the internal width of the high intensity mixer and the blade should be of a shape that provides both vertical and radial circulation of the admixture during the mixing steps of the method and process.

* denotes trade mark

With the mixer containing the polyethylene powder in operation, pigment is introduced into the mixer at a rate of not more than 0.5 parts of pigment per 100 parts of polyethylene per minute. In preferred embodiments, the rate is not more than 0.4 parts, and more preferably not more than 0.3 parts, per 100 parts of polyethylene per minute. The mixture of polyethylene and pigment is continuously admixed during the period of introduction of the pigment to the mixer. The pigment is in the form of a powder having a particle size that is substantially smaller than that of the polyethylene. In preferred embodiments, the particle size of the pigment should be not greater than 5% of that of the polyethylene, and more preferably not greater than 0.5% of that of the polyethylene.

In some instances, the pigment will exhibit tendencies to agglomerate, and form particles that are substantially larger than the particles of the polyethylene. Such agglomerate particles may be fed to the mixer, provided that the mixer is capable of de-agglomerating the particles to a size in the range described above. In order to do so, it is preferred that the mixer be equipped with blades that do not have a smooth leading edge. For example, the blades may have square leading edges, knife edges or the like, so as to facilitate de-agglomeration of the particles of pigment.

After addition of the pigment has been completed, the admixing of pigment and polyethylene in the mixer is continued for a period of time that is at least 50% as long as the time of addition of the pigment, and especially at least as long as the time of addition of the pigment and in particular twice as long as the time of such addition.

The physical admixture of particles formed by the above method does not exhibit significant tendencies for particles of the pigment and polyethylene to separate into separate fractions on storage or transportation; the admixture is however not in the form of a melt blend.

The pigment fed to the high intensity mixer in the method of the present invention preferably has a particle-size in the range of 0.2 to 10 microns, and more preferably in the range of 0.8 to 1.2 microns. For compositions that are to be fed to the mould of a rotational moulding apparatus, the pigments should be inorganic and be capable of withstanding temperatures of a rotational moulding process, e.g. about 300° C., without decomposition. In preferred embodiments, the pigment is 0.05–1.0% by weight of the polyethylene, especially 0.3–0.6% by weight.

In embodiments of the method of the present invention, additives in liquid form are also fed to the high intensity mixer. The additives may be added to the mixer prior to addition of the pigment, but preferably such additives are added subsequent to the addition of pigment to the mixer. It is to be understood that the time of mixing would need to be extended to permit adequate mixing of the liquid additive and polymer. Examples of liquid additives that may be added are organic peroxides e.g. the organic peroxide available as Vulcup R organic peroxide, silanes, e.g. vinyl trimethoxy silane, and anti-static agents e.g. polyethylene glycol.

In the process of the present invention, the physical admixture is fed to a mould of a rotational moulding apparatus. The mould is then rotated around at least two of its axes and, at the same time, is heated to a temperature above the melting point of the polymer, by means and under conditions that will be understood by those skilled in the art. A layer of molten polyethylene containing pigment forms on the inside surface of the mould. Subsequently, the mould is cooled and the mould article is removed from the mould. As is exemplified hereinafter, articles so moulded have physical properties substantially similar to similar articles moulded from natural or unpigmented polyethylene, and superior to articles moulded using physical blends of polyethylene and pigment formed in as tumble blender.

The physical admixtures formed by the method of the present invention may be used to manufacture a wide variety of articles, especially containers and other hollow articles, as will be appreciated by those skilled in the art.

The present invention is illustrated by the following examples:

EXAMPLE I

Two kilograms of polyethylene powder were fed to a Henschell mixer having a capacity of 10 litres. The mixer was equipped with blades have a square profile on the leading edge. The mixer was operated so that the blades rotated at a speed of approximately 2500 cm/sec. With the mixer in operation, 8 grams of pigment powder containing some agglomerates were fed to the Henschell mixer over a period of about one minute. Mixing was continued for a further period of two minutes.

As a comparison, a similar blend was prepared using a tumble blender.

The polyethylene was Sclairlink ®8000 cross-linkable polyethylene having a particle size of 500 microns. The pigment was PEC 60435 from Accurate Color Inc. of Ohio, U.S.A., a dark green pigment having a particle size of one micron.

Compression moulded plaques having a thickness of 0.3 mm were made from each of the blends by melt pressing the blends at a temperature of 180° C. followed by cooling the thus moulded plaques in water at 25° C. Opacity of the plaques was measured on an arbitrary scale of from 1 (poor) to 5 (good). It was found that plaques formed from the blend of the present invention had an opacity of 4 whereas plaques from the tumble blend had an opacity of 1.

In addition, the colour of the plaques was measured on a Colormaster ® colour instrument. The results obtained, using the colour indices measured by the instrument, were as follows:

| Colour Indices | Tumble Blend | Mixer Blend |
| --- | --- | --- |
| W | 2.02 | 1.1 |
| Y-1 | 7.3 | 11.9 |
| Y-2 | 14.1 | 19.8 |

These results show that the blend formed using the method of the present invention gave superior opacity and better colour than the blend formed in the tumble mixer.

EXAMPLE II

The procedure of Example I was repeated using a number of pigments; all pigments had a particle size of approximately one micron. The resultant physical blends, and similar blends formed for comparison using a tumble blender, were each subjected to a rotational moulding process. The mould used was a rectangular box mould and the moulded articles obtained had a wall thickness of 0.63 cm. The same moulding conditions were used in all runs.

Sections were cut from the moulded boxes and subjected to a dart impact test using a procedure of the Association of Rotomolders viz. ARM 10.6.84, at −40° C. and using dart weighing 6.36 kg and having a 2.5 cm diameter head. The drop height at which 50% of the samples tested did not fail was recorded; the equipment was only capable of being used with dart drop heights of up to 3.3 meters.

The results obtained were as follows, the amounts of pigment being by weight of polyethylene:

| Pigment* | Dart Drop Height (meters) | |
| --- | --- | --- |
| | Tumble Blend | Mixer Blend |
| none | >3.3 | >3.3 |
| 0.3% yellow | 3.0 | >3.3 |
| 0.8% white | <1.5 | 3.3 |
| 0.2% mid-blue | 2.4 | >3.3 |
| 0.4% dark green | 2.4 | >3.3 |

*The yellow pigment was DC 40436 from Accurate Color Inc.;
The white pigment was Ti-Pure ® R201 from E. I. du Pont de Nemours and Company;
The mid-blue pigment was DC 50574 from Accurate Color Inc.;
The dark green pigment was PEC 60435 from Accurate Color Inc.

This example shows that the moulded articles formed using the physical pigment blends of the present invention had physical properties similar to those of the polyethylene without pigment and substantially superior to articles formed using the tumble blends.

Testing of the preparation of the physical blends showed that addition of all of the pigment at the beginning of the mixing cycle in the Henschell mixer, rather than over a period of one minute as was used for the above example, resulted in poor pigment distribution of the pigment in the physical blend. In addition, use of blades in the mixer that had rounded leading edges failed to break up pigment agglomerates and resulted in rotationally moulded articles of poor impact strength

I claim:
1. A method for the manufacture of a physical blend of particles of polymer and pigment, said method comprising the steps of:
   (a) feeding a powder of a thermoplastic polymer to a high intensity mixer having a blade the spaced of at least 2,000 cm/sec, said powder having a particle size in the range of 250 to 750 microns;
   (b) feeding a powdered pigment to the high intensity mixer at a rate of not more than 0.5 parts of pigment per 100 parts of polymer powder per minute, said pigment being of a particle size that is not greater than 5% of the polymer, the polymer powder and pigment being admixed in said high intensity mixer during the period of addition of the pigment to the mixer;
   (c) subsequent to the feeding of the pigment to the mixer, continuing admixing of the polymer powder and pigment powder in the high intensity mixer for a period of time at least 50% as long as the time of addition of the pigment to the high intensity mixer; and
   (d) discharging the resultant physical blend of discrete particles from the mixer.

2. The method of claim 1 in which the thermoplastic polymer is a polyolefin that is a homopolymer or copolymer of a $C_2$—$C_{10}$ *alpha-olefin*.

3. The method of claim 2 in which the thermoplastic polymer is a homopolymer of ethylene or copolymer of ethylene and a higher alpha-olefin.

4. The method of claim 3 in which the polymer has a density in the range of 0.950–0.970 g/cm$^3$.

5. The method of claim 3 in which the high intensity mixer is equipped with blades adapted to break up agglomerates in the pigment.

6. The method of claim 3 in which the high intensity mixer is equipped with blades that are rotated at a tip speed of at least 2000 cm/sec.

7. The method of claim 3 in which the blades are rotated tip speed of at least 4000 cm/sec.

8. A process for the rotational moulding of articles, comprising:
  (a) feeding to the mould of rotational moulding apparatus a physical blend of particles of powdered polymer and pigment, said blend having been formed in a high intensity mixer by (i) feeding a powder of a thermoplastic polymer to a high intensity mixer having a blade speed of at least 2,000 cm/sec said powder having a particle size in the range of 250 to 750 microns, (ii) feeding a powdered pigment to the high intensity mixer at a rate of not more than 0.5 parts of pigment per 100 parts of polymer powder per minute, said pigment being of a particle size that is not greater than 5% of the polymer, the polymer powder and pigment being admixed in said high intensity mixer during the period of addition of the pigment to the mixer, (iii) subsequent to the feeding of the polymer to the mixer, continuing admixing of the polymer powder and pigment powder in the high intensity mixer for a period of time at least 50% as long as the time of addition of the pigment to the high intensity mixer, and (iv) discharging the resultant physical blend of discrete particles from the mixer;
  (b) rotating said mould about at least two axes while heating the mould, so that a molten layer of polymer containing pigment is formed on the inside of the mould; and
  (c) cooling the mould and removing the article so moulded.

9. The process of claim 8 in which the thermoplastic polymer is a homopolymer of ethylene or copolymer of ethylene and a higher alpha-olefin.

10. The process of claim 9 in which the polymer has a density in the range of 0.950–0.970 g/cm$^3$.

11. The process of claim 9 in which the high intensity mixer is equipped with blades adapted to break up agglomerates in the pigment.

12. The process of claim 9 in which the high intensity mixer is equipped with blades that are rotated at a tip speed of at least 2000 cm/sec.

13. The process of claim 9 in which the blades are rotated at a tip speed of at least 4000 cm/sec.

* * * * *

UNITED STATES PATENT AND TRADEMARK OFFICE
CERTIFICATE OF CORRECTION

PATENT NO. : 4,906,428

DATED : March 6, 1990

INVENTOR(S) : Peter Yates Kelly

It is certified that error appears in the above-identified patent and that said Letters Patent is hereby corrected as shown below:

In the Claims:

Claim 1:
Col. 6, line 44, after the word blade, delete "the spaced" and insert in place thereof --tip speed--.

Claim 8:
Col. 7, line 16, after the word mixer insert --having a blade tip speed of at least 2,000 cm/sec.--.

Col. 7, line 18, after the word mixer delete "having a blade tip speed of at least 2,000 cm/sec."

Signed and Sealed this

Fourth Day of December, 1990

Attest:

HARRY F. MANBECK, JR.

Attesting Officer     Commissioner of Patents and Trademarks